United States Patent [19]

Luse et al.

[11] Patent Number: 5,602,854
[45] Date of Patent: Feb. 11, 1997

[54] WIRELESS PERSONAL LOCAL AREA NETWORK UTILIZING REMOVABLE RADIO FREQUENCY MODULES WITH DIGITAL INTERFACES AND IDLE SENSE COMMUNICATION PROTOCOL

[75] Inventors: Ronald E. Luse; Ronald L. Mahany; Guy J. West; Charles D. Gollnick, all of Cedar Rapids, Iowa

[73] Assignee: Norand Corporation, Cedar Rapids, Iowa

[21] Appl. No.: 27,140

[22] Filed: Mar. 5, 1993

Related U.S. Application Data

[63] Continuation-in-part of Ser. No. 997,693, Dec. 23, 1992, abandoned, which is a continuation-in-part of Ser. No. 982,292, Nov. 27, 1992, abandoned, which is a continuation-in-part of Ser. No. 700,704, May 14, 1991, abandoned, which is a continuation-in-part of Ser. No. 699,818, May 13, 1991, abandoned.

[51] Int. Cl.$^6$ ................ H04J 3/16; H04B 7/00; H04L 12/28
[52] U.S. Cl. ............ 370/313; 455/38.3; 455/54.1; 455/343; 370/431
[58] Field of Search .................. 370/85.3, 85.7, 370/85.8, 93, 94.1, 95.1, 95.2; 340/825.08; 455/11.1, 13.4, 38.3, 54.1, 54.2, 89, 343, 56.1; 364/424.04, 709.4, 403; 235/385; 379/58

[56] References Cited

U.S. PATENT DOCUMENTS

| 4,539,706 | 9/1985 | Mears et al. .................. 455/11 |
| 4,606,044 | 8/1986 | Kudo ............................ 375/13 |
| 5,023,824 | 6/1991 | Chadima, Jr. et al. ............ 364/708 |
| 5,029,183 | 7/1991 | Tymes .......................... 375/1 |
| 5,046,066 | 9/1991 | Messenger ..................... 370/94.1 |
| 5,179,721 | 1/1993 | Comroe et al. ................. 455/33.1 |
| 5,220,564 | 6/1993 | Tuch et al. .................... 370/94.1 |
| 5,220,678 | 6/1993 | Feei ............................ 455/69 |
| 5,241,542 | 8/1993 | Natarajan et al. .............. 370/95.3 |
| 5,289,378 | 2/1994 | Miller et al. .................. 364/424.04 |

Primary Examiner—Hassan Kizou
Attorney, Agent, or Firm—Henderson & Sturm

[57] ABSTRACT

A transceiver apparatus for creating a wireless personal local area network between a computer terminal and one or more peripheral devices. A separate transceiver is connected to the computer terminal and to each peripheral device. The transceivers can be connected to the terminal or peripheral device either internally or externally. A low power radio is used to communicate information between the computer terminal and peripheral devices. Different transceivers can be used for modifying the carrier frequency and power of the local area network. The microprocessor is located inside each transceiver and controls the information flow of the transceiver including the communication protocol which allows each device to know if other devices are communicating, which devices are being communicated to, and selectively address the peripheral devices. An Idle Sense communication protocol is used for information transfer between the computer terminal and the peripheral devices, increasing efficiency in power management and compensating for transmission collisions.

14 Claims, 4 Drawing Sheets

WIRELESS PERSONAL LOCAL AREA NETWORK UTILIZING REMOVABLE RADIO FREQUENCY MODULES WITH DIGITAL INTERFACES AND IDLE SENSE COMMUNICATION PROTOCOL

CROSS REFERENCE TO RELATED APPLICATIONS

Claiming Benefit Under 35 U.S.C. 120

This present application is a continuation-in-part of U.S. application Ser. No. 07/997,693 filed Dec. 23, 1992 by Luse et al, abandoned, which is in turn a continuation-in-part of U.S. application Ser. No. 07/982,292 filed Nov. 27, 1992 by Luse et al., abandoned, which in turn is a continuation-in-part of pending U.S. application Ser. No. 07/700,704 filed May 14, 1991 by R. Mahany, Gollnick et al., abandoned, which in turn is a continuation-in-part of earlier U.S. application Ser. No. 07/699,818 filed May 13, 1991 (now abandoned) by R. Mahany, Gollnick et al.

Reference is hereby made to the following related pending and earlier applications pursuant to 35 U.S.C. 120:

| Serial No. | Filed | Inventors | Status | Attorney Docket No. |
|---|---|---|---|---|
| 07/529,353 | 05/25/90 | Mahany et al. | Abandoned | 6649XY |
| 07/558,895 | 07/25/90 | Mahany et al. | Abandoned | 6649XZ |
| 07/854,115 | 03/18/92 | Mahany et al. | Abandoned | 6649XZA |
| 07/876,776 | 04/28/92 | Mahany et al. | Abandoned | 6649XZB |
| 07/876,629 | 04/30/92 | Mahany et al. | Abandoned | 6837D |

All of the foregoing pending and earlier applications are hereby incorporated by reference in their entireties. Also incorporated herein by reference is the following international application:

International Application No. PCT/US91/05234 filed Jul. 24, 1991 (Attorney Docket No. 36649XZ(PCT)), and published as WO 92/02084 on Feb. 6, 1992.

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to computer terminals and peripheral devices used for transmitting, receiving and storing information and more particularly to a method and apparatus for wireless connections between the computer terminals and the peripheral devices.

Background Art

Computer terminals and peripheral devices are now used in practically every aspect of life. Computer terminals come in all shapes and sizes and vary greatly in terms of function, power and speed. Additionally, the number of peripheral devices which can be attached to the computer terminals is increasing. Many peripheral devices exist such as printers, modems, graphics scanners, text scanners, bar code scanners, magnetic card readers, external monitors, voice command interfaces, external storage devices, and so on.

Computer terminals and peripherals have become dramatically smaller and more portable. Personal computers and peripherals are small enough to sit on the desk at work. Smaller still are lap top computers and notebook computers. There are computer terminals which are small enough to be mounted in a vehicle such as a delivery truck or on a fork lift. Still smaller are the hand held terminals typically used for their portability features where the user can carry the computer terminal in one hand and operate it with the other.

Despite the reduction in computer size, the computer terminal still must physically interface with the peripheral devices. Thus, there must either be a cable running from one of the computer terminal to each device or the computer terminal must be docked with the device while the information transfer is to take place.

In the office or work place setting, the physical connection is typically done with cables. These cables pose several problems. If there are many peripheral devices, there must be many cables attached to the computer terminal. In addition to the eyesore created by all of the cables, the placement of the peripheral devices is limited by the length of the cable. Longer cables can be used but they are costly and do not alleviate the eyesore created by having cables running in all directions. Additionally, there may be a limited number of ports on the computer terminal thus limiting the number of peripherals that can be attached.

Another problem exists when there are several computer terminals which must share the same peripheral device such as a printer. All of the computers must be hardwired to the printer. As discussed above, long cables can fix this problem at least from a physical connection perspective but there still remains a protocol problem between the different computers. This problem is especially severe when the various computers are of different types such as a mixed environment of IBM's and Macintoshes.

In the smaller computer terminal setting, the hand-held terminals and the portables, the cabling and connection problem can be more severe and cumbersome. Peripheral devices such as printers and scanners of all types have been reduced dramatically in size to match the smallness of the computer terminals. A notebook computer operator may wish to carry the computer and a cellular phone modem in a briefcase. Similarly, an operator may wish to have a hand-held computer terminal in one hand, a small portable printer attached to his belt, and a bar code scanner in the other hand. The smallness of the computers and peripherals makes these demands possible but the required cabling makes these demands costly, inconvenient and even dangerous.

Physically connecting the computer terminals and peripherals severely reduces the efficiency gained by making the units smaller. An operator must somehow account for all of the devices in a system and keep them all connected. This can be very inconvenient. In the notebook computer and modem example, the operator may wish to have freedom to move around with the computer but without the modem. He may, for example, wish to work in various locations on a job sight and at various times transmit or receive information via his modem. If the modem and the computer are hard wired together, he must either carry the modem with him at all time or connect it and then disconnect it each time he wishes to use the modem. Similarly, the operator of the hand held terminal, scanner and printer will have the feeling of being all tied up while using the three devices simultaneously when all three devices are connected with cables.

The physical connections created by cabling can be expensive because cables frequently prove to be unreliable and must be replaced frequently. In portable environments, cables are subject to frequent handling, temperature extremes, dropping and other physical trauma. It is not uncommon for the cables or the connectors for the cables on the devices to need replacing every three months or so. Additionally, all of the cabling can be dangerous. An operator who is using, holding or carrying several devices and feels all tied up is not just inconvenienced, he may be severely limited in his mobility and flexibility as he moves about the work area. This loss of mobility and flexibility directly undercuts the entire reason for having small and portable computers and peripheral devices and greatly increases the likelihood of operator injury while using the computer and peripheral devices.

Furthermore, as the cables wear out and break, which, as mentioned, happens frequently, there are dangers which are associated with the electrical current running through the cables. If the cable or connectors break, the current could shock the operator or create a spark which could cause a fire or even an explosion in some work environments.

Attempts to alleviate or eliminate these problems have been made but have not been greatly successful. One solution is to incorporate a computer terminal and all of the peripherals into one unit. However, this solution is unsatisfactory for several reasons. The incorporation of many devices into one unit greatly increases the size and weight of the unit. This is counterproductive when the main reason for having small machines is portability and ease of use. Furthermore, incorporating all of the functions into one unit greatly reduces and, in most cases eliminates, the flexibility of the overall system. A user may only wish to use a terminal one time, but the next time may also wish to use a printer, and then the following time may not want the printer but want a bar code scanner. An all-incorporated unit thus becomes either overly large because it must include everything, or very limiting because it does not include everything.

Another solution has been to set up Local Area Networks (LAN's) utilizing various forms of RF communication. The LAN's to date, however, have been designed for large scale wireless communications between several computer terminals or between several computer terminals and a host computer. These systems have proven ineffective as a solution for communication between a computer terminal and its peripherals. The primary problems have been the cost, size and power consumption of these systems. The systems are designed for long range RF communication and often require either a licensed frequency or must be operated using spread spectrum technology. Thus, these radios are typically cost prohibitive and too large for convenient use with personal computers and small peripheral devices. Additionally, the protocol for communication between several computer terminals (as opposed to a computer terminal and one or more peripheral devices) is different and has not been addressed.

Thus, there is a need for an apparatus used to create a short range personal local area network system for wireless communications and connections between computer terminals and their peripherals.

Disclosure of the Invention

The present invention relates generally to computer terminals and peripherals and, more specifically, to an apparatus for creating a wireless local area network between the computer terminal and its peripherals. A small, relatively inexpensive transceiver is attached to, either internally or externally, a computer terminal and each peripheral device. The transceiver device allows for wireless communication of data or information between the computer terminal and the peripheral devices. A microprocessor, located inside of the transceiver, controls the flow of information flowing through the transceiver. A lower power radio is used to transmit and receive information. The microprocessor also controls the communication protocol used for the computer terminal and each peripheral device.

An object of the present invention is to provide a wireless personal local area network utilizing a low powered radio for communication between a computer terminal and its peripheral devices.

Another object of the present invention is to provide a wireless personal local area network for computer terminals and peripheral devices which is low cost, reliable and convenient to use.

A further object of the present invention is to provide a wireless personal local area network which eliminates the dangers and inconveniences of hardwiring computer terminals and peripheral devices together.

Another object of the present invention is to provide a wireless personal local area network that eliminates compatibility problems between computer terminals and peripheral devices.

Still another object of the present invention is to provide a wireless personal local area network which can selectively address particular devices in the network.

Other objects, advantages, and novel features of the present invention will become apparent from the following detailed description of the invention when considered in conjunction with the accompanying drawings.

BEST MODES FOR CARRYING OUT THE INVENTION

Figure 1:
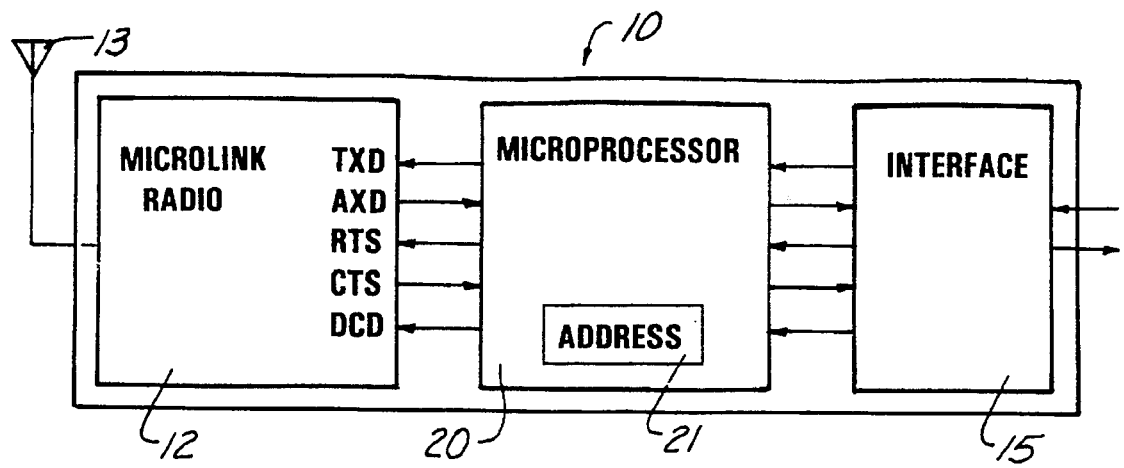
FIG. 1 is a block diagram of a transceiver unit built in accordance with the present invention.

Referring now to the drawings wherein like reference numerals designate identical or corresponding parts throughout the several views, FIG. 1 shows a transceiver (10) built in accordance with the present invention. The transceiver (10) has a radio unit (12) with an attached antenna (13). The radio unit (12) is a low power radio which operates at a frequency of 27 Mhz, can transfer information in asynchronous form at a rate of 19.2K BPS and has a range of approximately 40 to 100 feet. The benefit of using the 27 Mhz frequency is that it is an unlicensed frequency band. However, many different frequency choices could be made and these choices will naturally affect some of the other performance characteristics.

An interface (15) connects the transceiver (10) to a computer terminal or a peripheral device. Many different interfaces (15) could be used and the choice will depend upon the connection port of the device to which the transceiver (10) will be attached. Virtually any type of interface (10) could be adapted for use with the transceiver (10) of the present invention. Common industry interface standards include RS-232, RS-422, RS-485, 10BASE2 Ethernet, 10BASE5 Ethernet, 10BASE-T Ethernet, fiber optics, IBM 4/16 Token Ring, V.11, V.24, V.35, Apple Localtalk and telephone interfaces.

A microprocessor (20) is connected between the interface (10) and the radio unit (12) and controls the information flow between the radio unit (12) and the interface (15). The microprocessor (20) also controls the communication protocol between the computer terminal and all of the peripheral devices.

The protocol is software driven and is run by the microprocessor (20). It controls when the radio unit (12) transmits and receives data and the form of that data. By allowing the communication protocol-to modify the form of the transmitted and received data, otherwise incompatible devices can communicate with each other. The protocol will always check to make certain that the device it wishes to transmit to is not already being communicated with before it sends a signal.

In order to insure that the proper device is receiving the information transmitted, each device has a unique address. The transceiver (10) can either have a unique address of its own or can use the unique address of the device to which it is attached. The unique address of the transceiver can either be one selected by the operator or system designer or one which is permanently assigned at the factory such as an IEEE address. The address (21) of the particular transceiver (10) is stored in the microprocessor (20).

The transceivers built in accordance with the present invention can use an IDLE SENSE protocol to control communication between the various data devices. In an IDLE SENSE protocol system, the data device, which will be called the base device, with the greatest battery capacity will send IDLE SENSE messages to the other data devices at pre-arranged times. The data device need not be the computer terminal since it may be hand held and not have an abundance of battery capacity. The best data device may be a printer device which is worn on the belt and therefore may have a larger battery capacity. Or the best device may be a secondary display which is mounted to a vehicle of some sort which can utilize the power of the vehicle.

The IDLE SENSE message could be an invitation to the other data devices to send information if it has any or could indicate it had a message for one or more of the other data devices. If one of the other data devices has a message to send, it awaits an IDLE SENSE message from the base unit, starts the data link protocol, and then sends its message to any of the other units, including the base unit and including more than one unit. The base station monitors all of the traffic of the various signals and will not send an IDLE SENSE message until the channel is clear. If the other data device does not establish a conversation on the first try, it will wait for the next signal to try again.

Figure 5:
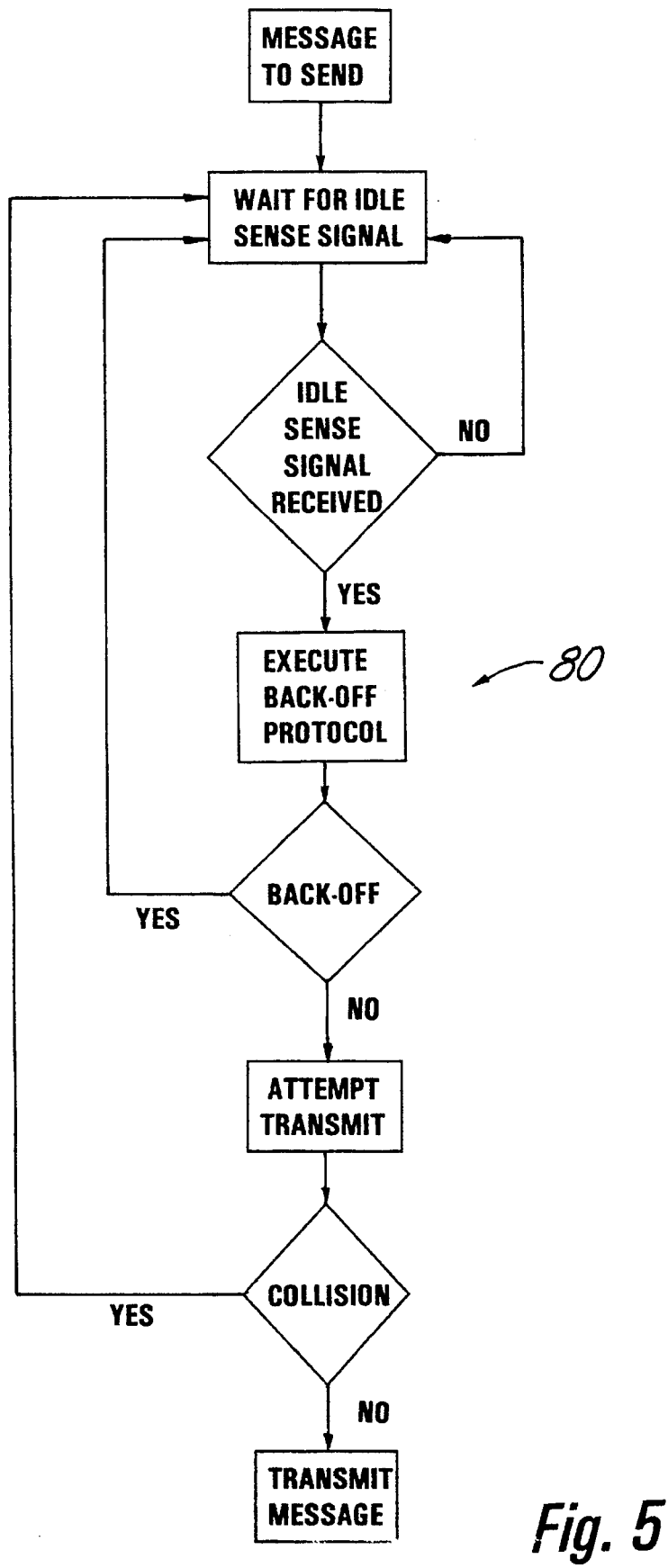
FIG. 5 is a block diagram of the idle sense protocol.

Referring to FIG. 5, a block diagram (80) of a typical idle sense protocol is shown. When a device has a message to send, assuming it is not the base device, it waits for an idle sense signal to be sent by the base device. When an idle sense signal is received, the device executes some form of back-off protocol to determine if it will actually attempt to transmit its message.

Back-off protocol prevents all devices from attempting to transmit messages every time an idle sense signal is transmitted by the base device. Several protocol strategies have been developed for carrier sense multiple access (CSMA) systems and include 1-persistent, nonpersistent and P-persistent. The CSMA strategies or variations thereof could easily be adapted to work in an idle sense protocol system.

If the back-off protocol determines that the device should wait, the device goes back to the wait for idle sense signal and starts over. If the protocol determines that the device should transmit, the device attempts to transmit its message to another device and simultaneously checks to see if there are any transmission collisions. If there are, then the device must go back to the wait for idle sense signal stage and wait for the next signal. If there are no collisions, the device can finish transferring its message to another device.

The idle sense and back-off protocol help to reduce the number of transmission collisions and also help to recover from collisions which do occur. Furthermore, by having the idle sense signals sent at predefined intervals, power consumption of all devices can be reduced. If the device knows when an idle sense signal might come, it only has to power up and listen at those times. This can result in significant power savings if the device does not have to be powered up between idle sense signals.

If the base unit drops out for any reason, protocol exists for one of the other units to assume the role of the base unit. This protocol can be, but is no limited to being, based upon the other data device which has the highest battery capacity. If the original base unit reappears, protocol exists to transfer the duties of sending the IDLE SENSE messages back to the original base unit.

If the other data devices do not detect the base unit sending IDLE SENSE messages, those station capable of being master will initiate sending IDLE SENSE messages. When a unit sending IDLE SENSE messages hears another unit sending IDLE SENSE messages, it will determine whether to continue to send IDLE SENSE messages based upon the power capacity of the other unit sending the messages. If the two units are of the same capacity, the two units will determine which will continue as the base unit on a predefined user priority and then by other such protocol if necessary.

Figure 2:
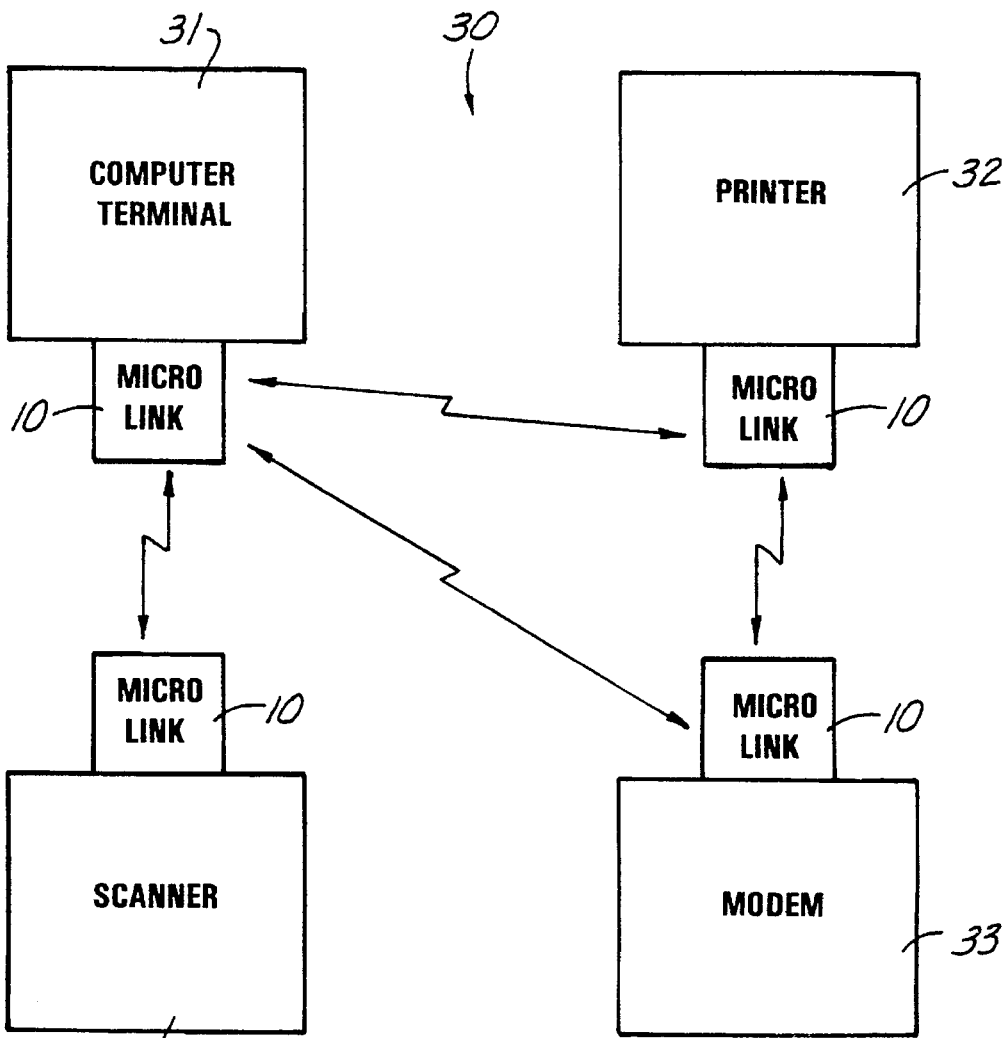
FIG. 2 is a block diagram of a computer system utilizing the transceiver units of FIG. 1.

Referring now to FIG. 2, a computer system (30) is shown utilizing transceivers (10), labeled microlink's, for information transfer between the computer terminal (31) and the peripheral devices (32, 33 & 34). As can be seen, using the transceivers (10) allows communication to occur between the computer terminal (31) and each of the peripheral devices (32, 33 &34) without the need for hardwiring them together.

The transceivers (10) can be interchanged with other transceivers (not shown) with different performance characteristics. For example, the transceivers may operate on a different radio frequency, may have a different data transfer rate, or may modulate the radio frequency in a different method.

It is also possible for two peripheral devices to communicate even in the absence of the computer terminal (31). This could be useful in a wide variety of situations. For example, an operator may wish to carry the computer terminal (31) and scanner (34) far enough away such that communication by the computer terminal (31) with the printer (32) and the modem (33) is not possible. However, while away, additional instructions might arrive via the modem (33) which could be directly printed on the printer (32). The communication protocol of the transceivers (10) could easily accommodate this situation and allow the communication to take place directly from the modem (33) to the printer (32) without the need for the computer terminal (31).

Figure 3:
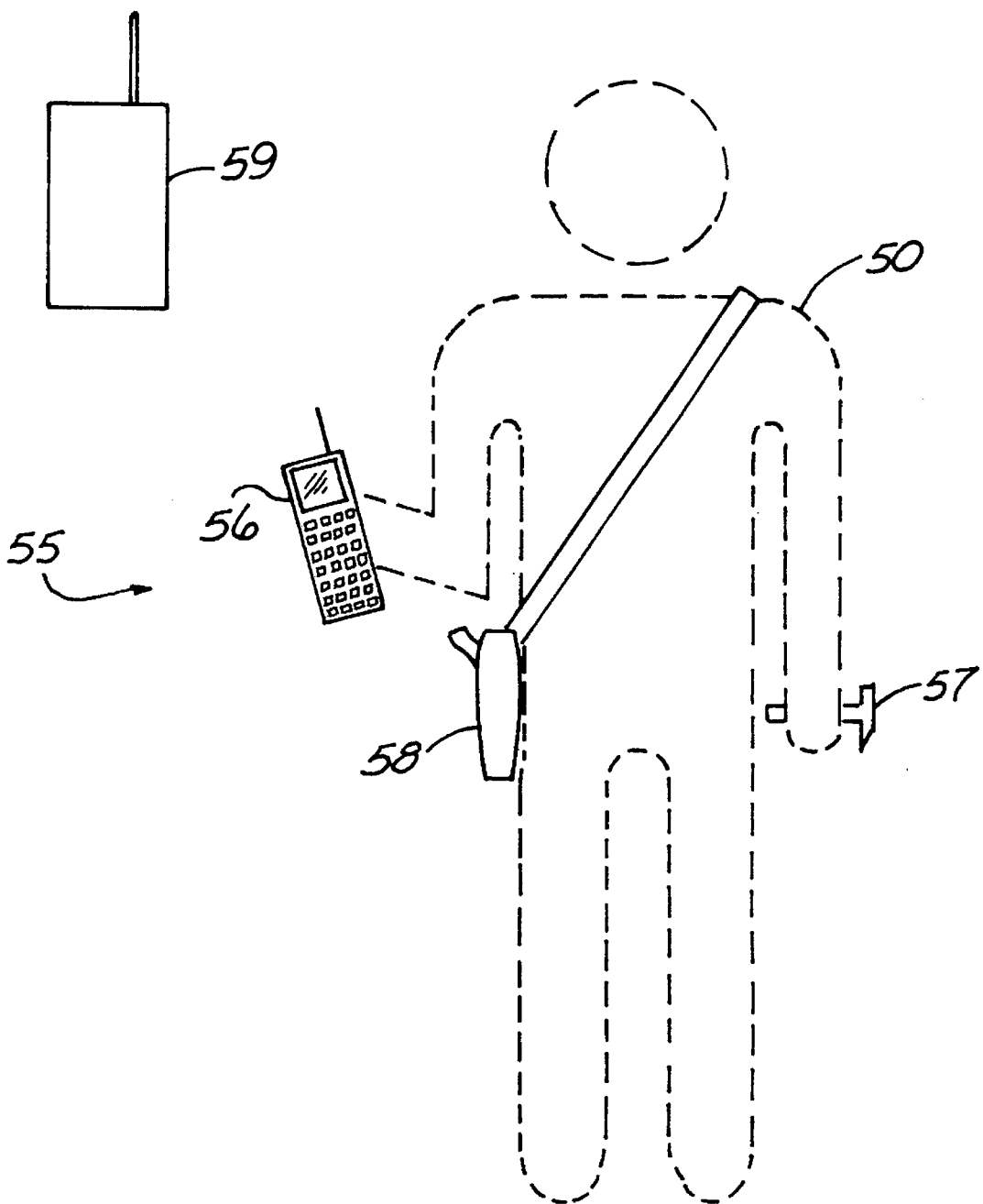
FIG. 3 is a diagrammatic illustration of a computer operator using a computer system utilizing the transceiver units of the present invention.

Referring now to FIG. 3, an operator (50) is shown using a computer system (55) which utilizes the transceivers built in accordance with the present invention. The operator (50) is shown with a hand held computer terminal (56), a hand held scanner (57) and a printer (58). Each of the hand held terminal (56), scanner (57) and printer (58) has an attached or internal low powered transceiver for wireless communication between the hand held terminal (56) and the printer (58) and scanner (57).

The hand held computer terminal (56) also contains a UHF or spread spectrum communication radio. This allows the hand held computer terminal to be simultaneously part of the personal local area network which utilizes the low powered transceivers which connects the hand held terminal (56) to the scanner (57) and the printer (58) and to a larger, longer range network. The hand held computer terminal (56) connects to the larger network by communicating directly with a base station (59) of the larger network.

Figure 4:
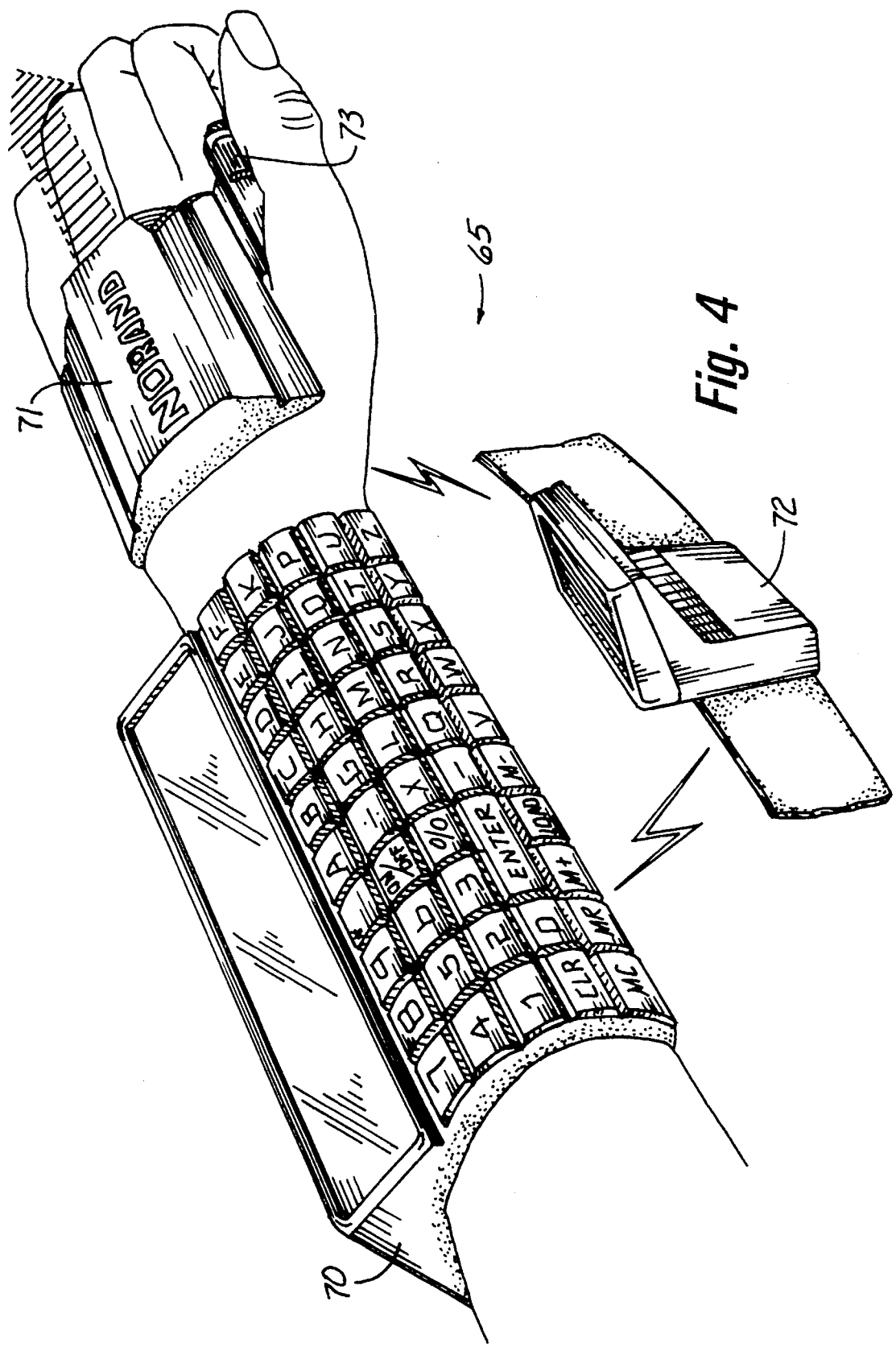
FIG. 4 is a diagrammatic illustration of a computer operator using an arm mounted computer system utilizing the transceiver units of the present invention.

Referring now to FIG. 4, a computer system (65) is shown utilizing mobile, or portable, data devices. The computer terminal (70) is strapped to the forearm of the operator. The scanner (71) straps to the back of the hand of the user and is triggered by pressing a button (73) with the thumb. The computer terminal (70) and the scanner (71) each have a low powered transceiver built in accordance with the present invention built inside. A printer (72) can be attached to the belt of the user. The printer (72) also has an internal transceiver built in accordance with the present invention.

The computer system (65) will likely use the IDLE SENSE message protocol for communication since all of the data devices are mobile and battery power will be a valuable resource. The base unit may be the printer module since it is attached to the belt and is most likely to have the highest battery capacity.

The transceivers located within or attached to the data devices need not all have the same range. In the computer system (65) of FIG. 4, the computer terminal (70) and the scanner (71) may have very short ranges of two meters or less while the printer (72) may have a communication range which is considerably longer. The printer need not necessarily have a longer range if the computer system is to be used in isolation, however, if the system is to be used as part of a larger network, it would require one of the data devices to have a longer range. Since the printer is likely to have the largest battery capacity, it is logical, though not required that the longer range transceiver be attached to it.

We claim:

1. A portable, personal local area network carried by a single user for capturing and processing data, comprising:

a first, a second and a third portable data device, each data device having a battery power supply;

at least one of said first, second and third portable data devices includes a display;

at least one of said first, second and third portable data devices includes means for collecting data;

a first, a second and a third radio frequency unit operably and respectively attached to said first, said second and said third portable data devices; and said first radio frequency unit managing communication among said first, second and third portable data devices.

2. The portable, personal local area network for a data capture system of claim 1 wherein the battery power supply of said first portable data device has a relatively high capacity in relation to said battery power supplies of said second and said third portable data devices, and wherein said first portable data device with said first radio frequency unit transmits IDLE SENSE messages and wherein said second portable data device with said second radio frequency unit and said third portable data device with said third radio frequency unit can initiate a communication sequence upon receiving one of said IDLE SENSE messages.

3. The portable, personal local area network for a data capture system of claim 2 wherein one of said second and said third portable data devices automatically assumes the transmission of IDLE SENSE messages when said first radio frequency unit is out of range thereof.

4. The portable, personal local area network for a data capture system of claim 3 wherein said first portable data device resumes responsibility for IDLE SENSE message transmission when it comes back into range of said second and said third portable data devices.

5. The portable, personal local area network for a data capture system of claim 2 including power management means for controlling and reducing the power consumption of said portable data devices, said power management means including means for transmitting said IDLE SENSE messages on a schedule and means for activating said radio frequency units only during IDLE SENSE messages and during subsequent communication sequences.

6. The portable, personal local area network for a data capture system of claim 1 wherein said second said third radio frequency units have a communication range of approximately two meters or less.

7. The portable, personal local area network for a data capture system of claim 1, wherein the data capture system comprising a remote stationary transceiver, and wherein at least one of the first, second and third portable data devices of the portable, personal local area network communicates with the remote stationary transceiver.

8. In a wireless communication network having a stationary, remote transceiver, a portable data capturing and processing system carried by a user, comprising:

a first portable unit comprising a data collection device and a first wireless transceiver;

a second portable unit comprising a peripheral device and a second wireless transceiver;

a third portable units comprising a third wireless transceiver;

said first, second and third wireless transceivers together forming a personal, wireless local area network to manage communication among said first, second and third portable units; and at least one of said first, second and third wireless transceivers communicatively couples with a stationary, remote transceiver within the wireless communication network.

9. The portable data capturing and processing system of claim 8, wherein the at least one of said first, second and third wireless transceivers which communicatively couples with a stationary, remote transceiver provides relaying functionality between the personal, wireless local area network and the stationary, remote transceiver.

10. The portable data capturing and processing system of claim 8, wherein the first portable unit comprises a coded image reader.

11. The portable data capturing and processing system of claim 8, wherein at least one of said first, second and third portable units may be worn by the user.

12. The portable data capturing and processing system of claim 8, wherein one of said first, second and third portable units manages communication on the personal, wireless local area network.

13. The portable data capturing and processing system of claim 12, wherein if the one of said first, second and third portable units which manages communication on the personal, wireless local area network fails to perform such management, another of said first, second and third portable units automatically takes over such management responsibilities.

14. The portable data capturing and processing system of claim 8, wherein the at least one of said first, second and third wireless transceivers that communicatively couples with the stationary, remote transceiver is capable of engaging in longer range communication in comparison to the others of the first, second and third wireless transceivers which are capable of engaging in only relatively short range communication.

* * * * *